US010061520B1

(12) United States Patent
Zhao et al.

(10) Patent No.: US 10,061,520 B1
(45) Date of Patent: Aug. 28, 2018

(54) ACCELERATED DATA ACCESS OPERATIONS

(71) Applicants: EMC Corporation, Hopkinton, MA (US); EMC IP Holding Company LLC, Hopkinton, MA (US)

(72) Inventors: Junping Zhao, Beijing (CN); Kenneth J. Taylor, Franklin, MA (US); Randall Shain, Wrentham, MA (US); Adrian Michaud, Carlisle, MA (US); Stephen Wing-Kin Au, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 15/189,447

(22) Filed: Jun. 22, 2016

(51) Int. Cl.
*G06F 3/06* (2006.01)

(52) U.S. Cl.
CPC ............ *G06F 3/0611* (2013.01); *G06F 3/064* (2013.01); *G06F 3/0673* (2013.01)

(58) Field of Classification Search
CPC .... G06F 3/0611; G06F 3/0647; G06F 3/0673; G06F 17/30088; G06F 17/30247; G06F 2201/84; G06F 3/061; G06F 11/1469
See application file for complete search history.

(56) References Cited

U.S. PATENT DOCUMENTS

2016/0350006 A1* 12/2016 Wang .................... G06F 3/0608
2017/0279770 A1* 9/2017 Woolward .......... H04L 63/0263

* cited by examiner

*Primary Examiner* — Reginald G Bragdon
*Assistant Examiner* — Thanh D Vo
(74) *Attorney, Agent, or Firm* — Ryan, Mason & Lewis, LLP

(57) ABSTRACT

Systems and methods are provided for implementing accelerated data access operations. For example, a method for accessing data includes loading an image into a memory, wherein the image comprises a plurality of image layers, and wherein each image layer references one or more data blocks. A request is received for a target data block from an active process operating on the image. Data structures associated with the target data bock are then accessed, wherein the data structures comprise metadata of a previous lookup path that was performed across one or more of the image layers of the image to access the target data block. The metadata of the data structures is utilized to access an existing in-memory copy of the target data block without having to traverse the previous lookup path, and the in-memory copy of target data block is returned to the active process.

20 Claims, 8 Drawing Sheets

ACCELERATED DATA ACCESS OPERATIONS

FIELD

The field relates generally to data storage and, more particularly, to data access techniques.

BACKGROUND

Copy-on-write (referred to herein as "COW") is a technique that is used in computer programming, which enables a point-in-time logical view of data. For example, with COW, multiple processes can share data (e.g., an image, snapshot, etc.) which is stored in memory or disk storage, wherein each process can read and utilize a local copy of data. When a given process needs to modify the data, however, then a separate local copy of that data will be generated on which the process can perform modifications, while the original shared copy of data remains unchanged. As such, COW is a policy that whenever a process attempts to modify shared data, the process will first create a separate (private) copy of that information to prevent the changes from becoming visible to the other processes.

COW is widely used in various applications such as Docker image backing stores, and applications that make use of VM (virtual machine) snapshots (e.g., copy of a virtual machine's disk file a given point in time), and array snapshots. In general, there are two types of COW implementations—one implementation which copies original data to a new location and another implementation which does not copy original data to a new location. Irrespective of the implementation, COW essentially divides a dataset into layers (e.g., deltas or snapshots) for storage efficiency, as each layer only maintains a portion of the data (e.g., the modified portion of the data). On the other hand, COW creates a cross-layer data implicit dependency such that if data is not found on a local layer, a query is made to a parent layer for the data, and this traversal process continues through the layers until the target data is found. This cross-layer dependency and traversal mechanism can lead to degraded performance resulting from, e.g., traversal lookup overhead, disk I/O amplification, and/or data memory amplification.

SUMMARY

Embodiments of the invention include systems and methods to accelerate data access operations. For example, one embodiment includes a method for accessing data. The method includes: loading an image into a memory, the image comprising a plurality of image layers, wherein each image layer references one or more data blocks; receiving a request for a target data block from an active process operating on the image; accessing data structures associated with the target data bock, wherein the data structures comprise metadata of a previous lookup path that was performed across one or more of the image layers of the image to access the target data block; utilizing the metadata of the data structures to access an existing in-memory copy of the target data block without having to traverse the previous lookup path; and returning the in-memory copy of target data block to the active process.

Other embodiments will be described in the following detailed description, which is to be read in conjunction with the accompanying drawings.

DETAILED DESCRIPTION

Illustrative embodiments will now be described in further detail with regard to systems and methods to accelerate data access operations in computing environments such as container-based applications. As noted above, a COW framework divides a dataset into layers (e.g., deltas or snapshots) which enhances storage efficiency, but which can lead to degraded performance when traversing the layers during data lookup operations. As explained in further detail below, to address such lookup performance issues (as well as associated I/O and memory amplification issues), embodiments of the invention implement an infrastructure of DRR (data relationship and reference) data structures which exploit metadata of a COW "layer hierarchy" to indicate data dependencies between different layers of an image. In addition, embodiments of the invention provide accelerated data access operations based on metadata of previous lookup results which is embodied in the DRR data structures to increase data lookup speed by either re-using data in memory or reducing lookup scope. In addition, the DRR data structures discussed herein serve to reduce duplicated read I/O operations and enable a single data copy w/multiple layer references. Embodiments of the invention can be implemented as an "add-on" module on top of existing COW infrastructures (rather than completely replacing or re-designing such existing COW infrastructures), including, but not limited to Docker images backed by COW Device-Mapper and AUFS (advanced multi layered unification filesystem) storage drivers, Array snapshot frameworks (e.g., XtremIO snap, VNX SnapSure, etc.), and VM snapshot frameworks (e.g., VMWare snapshot).

Figure 1:
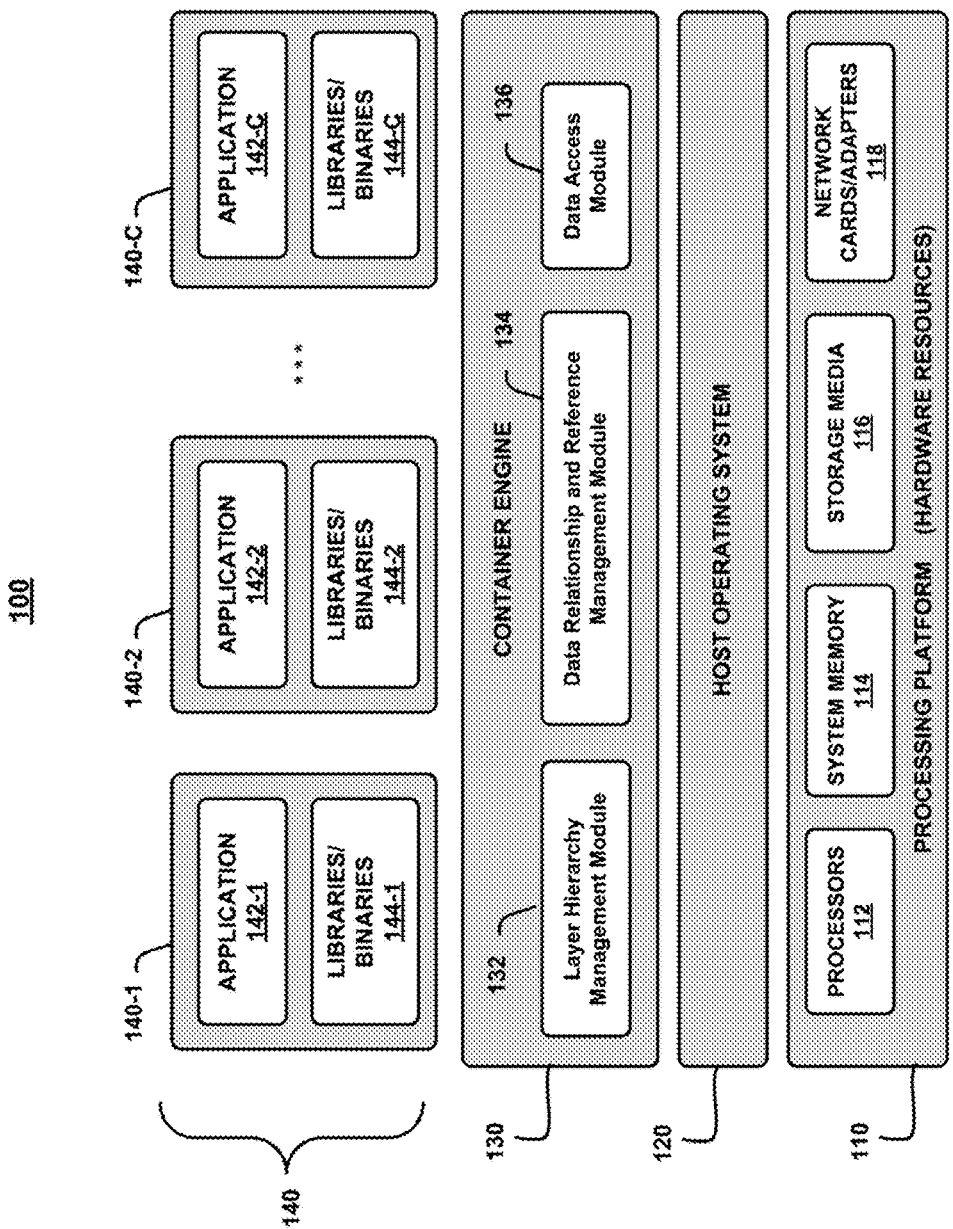
FIG. 1 is a high-level schematic illustration of a computing system which implements a system to accelerate data access operations for a container application, according to an embodiment of the invention.

FIG. 1 is a high-level schematic illustration of a computing system which implements a system to accelerate data access operations for a container application, according to an embodiment of the invention. In particular, FIG. 1 schematically illustrates a computing system 100 which comprises a processing platform 110 (or "bare metal" layer), a host operating system 120, a container engine layer 130, and a containerized application layer 140. The processing platform 110 comprises a plurality of hardware resources including, for example, processors 112, system memory 114 (e.g., system RAM), storage media 116 (e.g., persistent storage devices such as disk storage), and network cards/adaptors 118. The container engine layer 130 comprises, among other modules, a layer hierarchy management module 132, a data relationship and reference management module 134 (or DRR management module), and a data access module 136 (the functions of which will be explained in further detail below). The containerized application layer 140 comprises a plurality of application containers 140-1, 140-2, . . . , 140-C. The application containers 140-1, 140-2, . . . , 140-C include respective applications 142-1, 142-2, . . . , 142-C, and corresponding libraries/binaries 144-1, 144-2, . . . , 144-C.

In one embodiment of the invention, the computing system 100 comprises an application server node which runs a plurality of the application containers 140-1, 140-2, . . . , 140-C on the host operating system 120. In the bare metal layer 110, the processors 112 include one or more processors that are configured to process program instructions and data to execute the host operating system 120 and active instances of the application containers 140-1, 140-2, . . . , 140-C. The processors 112 include, for example, one or more of a computer processor, a microprocessor, a microcontroller, an application-specific integrated circuit (ASIC), a field programmable gate array (FPGA), and other types of processors, as well as portions or combinations of such processors.

The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient, than is possible for executing such functions in software running on a more general purpose processor.

The system memory 114 comprises electronic storage media such as random access memory (RAM), read-only memory (ROM), or other types of memory, in any combination. The term "memory" or "system memory" as used herein refers to volatile and/or non-volatile memory which is utilized to store application program instructions that are being used by the processors 112 to execute the host operating system 120 and the running instances of application containers 140-1, 140-2, . . . , 140-C, as well as to temporarily store data (e.g., via caches) which are being utilized and/or generated by the host operating system 120 and the running instances of application containers 140-1, 140-2, . . . , 140-C. The storage media 116 comprises any type of non-volatile storage media including, but not limited to, HDDs (hard disk drives), flash storage devices (e.g., PCIe flash cards), disk storage devices, SSD (solid state drive) devices, or other types and combinations of non-volatile memory and associated drive types such as external DAS (direct attached storage) devices that can be coupled to server nodes using suitable interfaces (e.g., SCSI, SATA or SAS interfaces).

The network cards/adapters 118 comprise network interface circuitry (e.g., network interface cards) which enables the computing system 100 (e.g., application server) to interface and communicate with other computing components over a communications network. In addition, the network cards/adaptors 118 further include storage interface circuitry (e.g., HBA (Host Bus Adaptor) cards) to provide input/output (I/O) processing and physical connectivity between the computing system 100 and off-infrastructure storage media of one or more data storage systems. The data storage systems may include, but are not limited to, storage area network (SAN) systems, network attached storage (NAS) systems, Hadoop Distributed File System (HDFS), as well as other types of data storage systems comprising clustered or distributed virtual and/or physical infrastructure.

As noted above, in one embodiment of the invention, the computing system 100 shown in FIG. 1 comprises an application server node running the application containers 140-1, 140-2, . . . , 140-C on the host operating system 120. In a container-based application framework, each application container 140-1, 140-2, . . . , 140-C includes a separate application and associated dependencies and other components to provide a complete filesystem, but shares the kernel functions of the host operating system with the other applications containers. Each application container 140-1, 140-2, . . . , 140-C executes as an isolated process in user space on the host operating system 120.

In general, the container engine layer 130 comprises various modules to create and run application containers, as well as create and manage images (which comprises a stack of read-only image layers) and read/write container layers that are mounted on a given image when a container instance is launched. The type of modules included in the container engine layer 130 will vary depending on the specific container application framework that is implemented. For purposes of illustration, exemplary embodiments of the invention may be discussed in the context of the well-known Docker application container framework, although it is to be understood that embodiments of the invention can be implemented with other types of container-based application frameworks or snapshot-based applications.

In Docker, an image is a read-only (RO) file that is used to generate a container. Each image comprises a stack of RO image layers in which a union file system is utilized to combine the RO image layers into a single image with a single coherent file system. A container is a running instance of an image, wherein the image is a file that is created to run a specific service or program in a particular OS. In other words, an image is created, and a container is created to use that image to run a specific program or service.

In a Docker implementation, the container engine layer 130 would implement various steps to create, run and manage a container using an image file, as follows. In response to a command to launch a container, the container engine layer 130 would access a target image file, create a container for the image file, allocate a filesystem for the container, mount a read-write (RW) container layer on the image file, and create an interface that allows the container to communicate with the host operating system 120. The container engine 130 is responsible for enabling and managing the RO image layers and RW container layers of an active container, as well as controlling data access operations by traversing the image layers, as will be discussed in further detail below with reference to FIG. 2.

Figure 2:
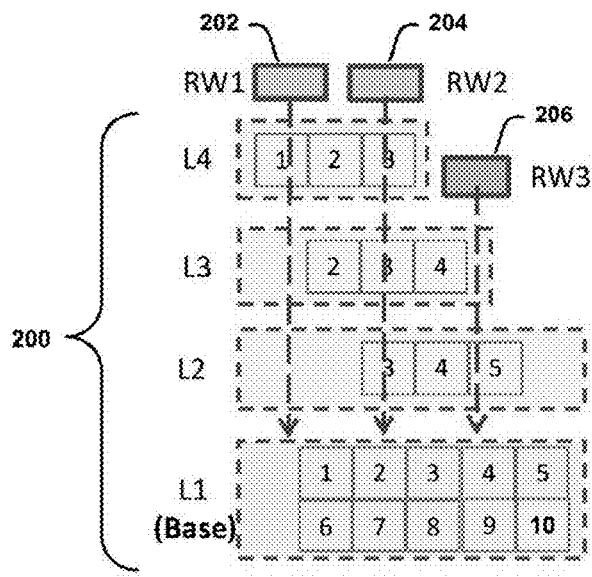
FIG. 2 schematically illustrates data access operations performed by container applications having associated read-write container layers mounted on read-only image layers of a shared image.

FIG. 2 schematically illustrates data access operations performed by container applications having associated read-write container layers mounted on read-only image layers of a shared image. In particular, FIG. 2 illustrates an image 200 comprising a plurality of image layers L1, L2, L3 and L4. The image layers L1, L2, L3, and L4 of the image 200 are read-only (RO) layers that are stacked on top of each other to provide a single unified view of a filesystem that is shared by multiple containers. In the example embodiment of FIG. 2, the first image layer L1 comprises a base image layer which contains a root file system and which references data bocks 1-10. The layers L2, L3 and L4 are RO layers that contain changes on the base image layer L1. For example, as shown in FIG. 2, the second image layer L2 references data blocks 3, 4 and 5, which represent modified versions of the data blocks 3, 4 and 5 referenced by the base layer L1. The third image layer L3 references data blocks 2, 3 and 4, which represent a modified version of the data block 2 referenced by the base layer L1, and modified versions of the data blocks 3 and 4 referenced by the second image layer L2. The fourth image layer L4 references data block 1, 2 and 3, which represents a modified version of the data block 1 in the base layer L1 and modified versions of the data blocks 2 and 3 referenced in the third image layer L3.

In this regard, the second image layer L2 represent a modified version of the base image layer L1, the third image layer L3 represents modified version of the image represented by the underlying image layers L1 and L2, and the fourth image layer L4 represents a modified version of the image represented by the underlying image layers L1, L2 and L3. Each time an existing image is modified, a new image layer is built on top of the existing image.

As further shown in FIG. 2, a plurality of RW container layers 202, 204 and 206 are mounted on the image 200. Each RW container layer 202, 204 and 206 corresponds to an active container. In FIG. 2, three active containers share and utilize the underlying image 200. In particular, as shown in the example of FIG. 2, the active containers associated with the first and second RW container layers 202 and 204 utilize the version of the underlying image 200 at the level of the fourth image layer L4, while the active container associated with the third RW container layer 206 utilizes the version of the underlying image 200 at the level of the third image layer L3.

The active containers can access (read) data blocks referenced by the image layers L-L4 of the underlying image 200, but cannot directly modify data blocks referenced by the image layers L 1-L4 of the underlying image 200. Instead, when a given container wants to modify one or more target data blocks of the underlying image 200, the target data block(s) must first be copied to the RW container layer associated with that container, wherein the container can then modify or write to the data block(s) copied into its RW container layer. The target data block(s) are copied into the RW container layer of a given container by COW operation that is performed by the data access module 136 of the container engine 130.

A conventional method for performing a COW operation is as follows. The storage driver of the container engine 130 would search through the RO image layers of the underlying image 200 for a target data block. This process starts at the upper (newest) image layer and traverses down to the base image layer one layer at a time. A "copy-up" operation is then performed on the first copy of the data block that is found (as it is assumed that this data block is the latest version), wherein the "copy up" operation essentially copies the data block to the RW container layer of the container. Thereafter, the container can modify or write to the copy of the data block contained in the RW container layer of the container.

In the example of FIG. 2, assume that an active container associated with either the RW container layer 202 or the RW container layer 204 wants to modify each of the data blocks 1-10 of the image 200. In a conventional COW process, the storage driver of the container engine 130 would initially access the fourth layer L4 to access a copy the newest versions of blocks 1, 2 and 3, then traverse down to the third image layer L3 to access a copy the newest version of block 4, then traverse down to the second image layer L2 to access a copy the newest version of data block 5, and finally traverse down to the base image layer L 1 to access a copy the base versions of blocks 6-10. Assume further that the container associated with the RW container layer 206 wants to modify each of the data blocks 1-10 of the underlying image 200, but with regard to the version of the image 200 at the level of the third image layer L3. The COW process (as shown in FIG. 2) would initially access the third image layer L3 to copy the newest versions of blocks 2, 3 and 4, then traverse down to the second image layer L2 to copy the newest version of data block 5, and finally traverse down to the base image layer L1 to copy the base versions of blocks 1 and 6-10.

In view of the above, there are various performance issues associated with conventional COW data access operations. For example, there can be significant overhead associated with traversing the various RO image layers of a given image to lookup a target data block that may exist in a given image layer. Indeed, if a target data block is not found in a local layer, the process will have to query the parent layer for the target data block, and then continue traversing the image layers until reaching the base (root) image layer to find the target data block. This traversal process is an unpredictable process that can result in performance degradation especially when there is significant amount of metadata I/O loading and queries. In addition, as the number of image layers of a given image increases, or as the hierarchy depth increases, the greater potential exists for performance degradation. Certain container applications such as Docker limit (or provide mechanisms to specify a limit to) the maximum number of RO image layers that may be stacked to form an image.

Another performance issue associated with COW data access operation relates to disk I/O amplification. For example, disk I/O operations would be amplified during image layer traversal under several circumstances. For example, during traversal of the image layers, a large amount of metadata (e.g., layer bitmap or disk mapping) needs to be paged-in from disk storage. In addition, the same data block would be duplicated read many times for different requests (such as different layer instances), because each layer and its I/O routine are logically independent and, traditionally, there is no way to definitively determine whether the data can be shared safely to avoid a duplicated read IO. Such I/O amplification can cause pressure in the system and adversely impact other running services.

In addition, data memory amplification is another performance issue associated with COW data access operations. Indeed, since (as noted above) the same data block could be read many times from disk storage and stored in memory for each of the different layers, such read duplication can result in many duplicated copies of the data block in memory. For example, assume that hundreds of Docker instances are executing on a given system, a large number of copies of a given data block of significant size (e.g., 4 KB-8 KB), which are accessed by a large number of active Docker instances, can require a significant memory footprint.

There are techniques that may be implemented to address the above performance issues. For example, a bitmap can be used per image layer to indicate whether a data block resides on that layer to speed-up the data lookup operation, but bitmaps do not resolve I/O and memory application issues discussed above. Moreover, the bitmap size is proportional to a total data size of the data blocks referenced by a given layer. Another technique includes combining the bitmaps of multiple image layers to reduce the memory footprint and increase query speed. Moreover, another conventional method that may be implemented for reducing the footprint of duplicated in-memory data includes data deduplication, which is a specialized data compression technique for eliminating duplicate copies of repeating data. However, data deduplication does not address the duplication disk I/O performance issues discussed above. In short, none of these conventional methods (except a complete COW redesign) can adequately address all of the performance issues noted above.

Embodiments of the invention as discussed herein provide novel techniques that address each of the performance issues discussed herein without the need to re-design COW. As explained in further detail below, such techniques exploit an existing COW layer hierarchy as "cost-free" metadata to accelerate data access operations. With existing COW infrastructures, a tree-like layer hierarchy already exists (see FIG. 4) on which a traverse-lookup is performed layer by layer, from leaf-to-parent, or from parent-to-parent, until reaching a root layer. While a conventional tree traversal process can be slow and can be subject to performance degradation due to I/O and memory duplication, as explained in further detail below, accelerated data access techniques according to embodiments of the invention utilize information regarding the image layer hierarchy as metadata to generate DRR data structures. These DRR data structure implement an acceleration layer (as an "add-on" to an existing COW infrastructure) which is utilized to reduce the scope of image layer traversal and avoid many duplicated read I/O operations, for example.

In the exemplary embodiment of FIG. 1, the layer hierarchy management module 132 is configured to generate and manage a hierarchical data structure (e.g., FIG. 4) comprising metadata that specifies data dependencies between different layers (RO image layers and RW container layers) of an active image instance. The DRR management module 134 generates and manages data structures (e.g., FIGS. 5, 6, 7) that enable multiple references to a single copy of data in memory, wherein the data structures are utilized to either re-use data in memory or reduce lookup scope. The data access module 136 utilizes the data structures generated by the modules 132 and 134 to perform accelerated data access operations, as will be discussed in further detail below with reference to FIGS. 3-9, for example.

Figure 3:
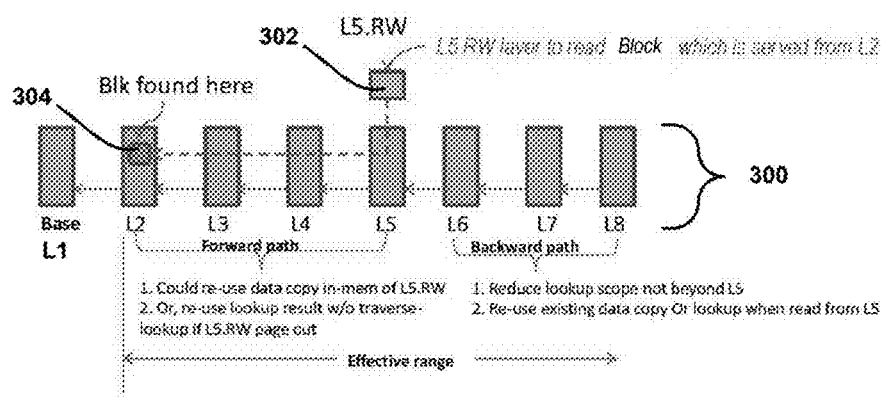
FIG. 3 schematically illustrates methods for accelerating data access operations using previous lookup records to traverse a layer hierarchy of an image, according to embodiments of the invention.

FIG. 3 schematically illustrates methods for accelerating data access operations by using previous lookup records to traverse a layer hierarchy of an image, according to embodiments of the invention. In particular, FIG. 3 illustrates an image 300 comprising a plurality of RO image layers including a base layer L1 and additional RO image layers L2, L3, LA, L5, L6, L7, and L8. Further, FIG. 3 shows a RW container layer 302 (L5.RW) at image layer L5 seeking access (read or partial write) to a given data block 304 which is served from (referenced by) the image layer L2. To access the data block 304 for the first time, the RW container layer 302 would traverse through the image layers L5→L4→L3→L2 until a reference to the target data block 304 is found at the image layer L2. The target data block 304 is then read from disk, for example, and a copy of the read data block 304 is stored in memory for the active RW container layer 302. The resulting search result (or lookup record) along the path of image layers L5→L4→L3→L2 can be denoted as a "forward path" lookup record that is maintained as metadata and re-used to accelerate subsequent data access operations for that data block 304.

For example, assume a second RW container layer is launched at the image layer L5 and issues a request to access the same data block 304 that was previously accessed by the first RW container layer 302 and stored in memory for the first RW container layer 302. To accelerate access to the data block 304, the second RW container layer can utilize the previous search results to determine that a copy of the data block 304 is already stored in memory for the first RW container layer 302. This enables the second RW container layer to re-use that copy of the data block 304 in memory without having to traverse the image 300 layer-to-layer from the image layer L5 to the image layer L2 to find the data block 304 at the image layer L2, and then access the data block 304 from disk and store another copy of the data block 304 in memory for the second RW container layer. Alternatively, if the copy of the data block 304 in memory for the first RW container layer 302 has been paged-out (e.g., moved from memory to hard disk or some other secondary storage), the second RW container layer can utilize the previous search results (e.g., "forward path" lookup record L5→L4→L3→L2) to determine that the target data block 304 is referenced by the image layer L2. This enables the second RW container layer to go directly to the image layer L2 to obtain the information needed to access the target data block 304 without having to traverse the image 300 along the path L5→L4→L3→L2 to find the data block 304 referenced by the image layer L2.

In addition, the "forward path" lookup record L5→L4→L3→L2 provides an indication that the target data block 304 does not exist in image layers L3 and L4. As such, if another RW container layer is mounted on the image layer L3 or the image layer L4 and wants to access the data block 304, that RW container layer could utilize the existing "forward path" lookup record L5→L4→L3→L2 (for the data bock 304) to determine that the target data block 304 is referenced by the image layer L2. This enables the RW container layer (operating at the image layer L3 or the image layer L4) to go directly to the image layer L2 to obtain the information needed to access the target data block 304 without having to traverse the image 300 along the path L3→L2 or the path L4→L3→L2 to find the data block 304. Alternatively, if the copy of the data block 304 in memory for the first RW container layer 302 has not yet been paged-out and still remains in memory, the RW container layer instance operating at the image layer L3 or the image layer L4 can utilized the previous search results to directly reference the in-memory copy of the data block 304 for the first RW container layer 302.

In addition, in the example embodiment of FIG. 3, the "forward path" lookup record L5→L4→L3→L2 can also be used to accelerate data lookup and data access operations for the data block 304, which are initiated by RW container layers operating at the image layers L6, L7 or L8. For example, assume that an active RW container layer is launched at the image layer L8 and issues a request to access the same data block 304 that was previously accessed by the first RW container layer 302 and stored in memory for the first RW container layer 302. The RW container layer would initially traverse the image layers L8→L7→L6 to find the data bock. If a reference to the target data block 304 is not found in any of the layers L8→L7→L6, the RW container layer could utilize the existing "forward path" lookup record L5→L4→L3→L2 (for the data bock 304) to access the target data block 304 without having to traverse the path L5→L4→L3→L2. In this example, the RW container layer at image layer L8 can either re-use the in-memory copy of the data block 304 for the first RW container layer 302 (if not paged out) or directly access image layer L2 to obtain a reference to the data block 304 based on the previous search results (e.g., "forward path" lookup record L5→L4→L3→L2). In this regard, the resulting search result (or lookup record) along the path of image layers L8→L7→L6 can be denoted as a "backward path" lookup record that is maintained as metadata and re-used to accelerate subsequent data access operations for the data bock 304.

As demonstrated from the above examples, lookup records that are generated from search results provide valuable information that can be utilized for building an acceleration layer for data access operations, according to embodiments of the invention. This is particularly useful in various container platforms, such as Docker, where the same image may have dozens of running instances. Indeed, data access operations according to embodiments of the invention exploit the information from resulting look-up records along with information regarding the image layer hierarchy (as explained below with reference to FIG. 4) to accelerate data access operations in response to requests for the same data block that come from the same instance, or new instances, or older instances. Each new request for the same data block, or different data blocks, would result in new lookup records, wherein such additional information would be further leveraged, thereby providing a recursive build process for constructing DRR data structures for an acceleration layer. Example embodiments of DRR data structures and metadata which can be generated to represent lookup records and utilized to support accelerated data access operations according to embodiments of the invention will now be discussed in further detail with reference to FIGS. 4, 5, 6 and 7, for example.

Figure 4:
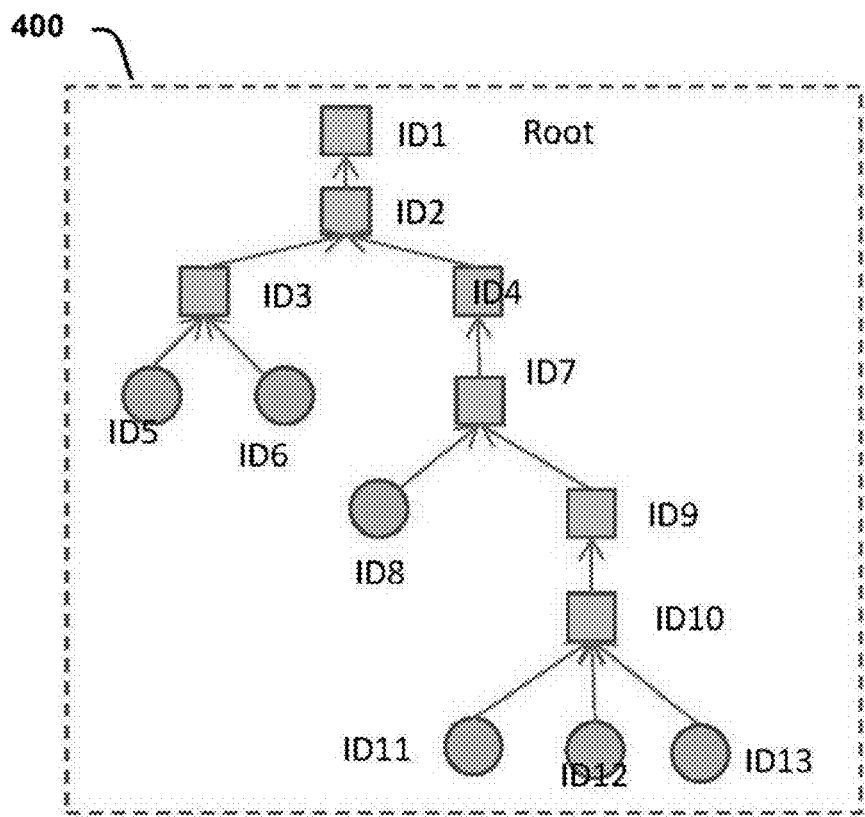
FIG. 4 illustrates a data structure to represent a layer hierarchy comprising read-only image layers and active read-write container layers, according to an embodiment of the invention.

FIG. 4 illustrates a data structure to represent a layer hierarchy comprising read-only image layers and active read-write container layers, according to an embodiment of the invention. In particular, FIG. 4 illustrates a data structure 400 in the form of a hierarchical node tree comprising a root node ID1, intermediate nodes ID2, ID3, ID4, ID7, ID9, and ID10, and leaf nodes ID5, ID6, ID8, ID11, ID12 and ID13. The root node ID1 represents a base image layer of the layer hierarchy represented by the data structure 400. The intermediate nodes ID2, ID3, ID4, ID7, ID9, and ID10 represent additional RO image layers that are stacked on top of the base image layer. The leaf nodes ID5, ID6, ID8, ID11, ID12 and ID13 represent different active RW container layers that are mounted on the same or different RO image layers. FIG. 4 further shows connecting lines (or branches) which define the hierarchical layer relationship (e.g., parent-child relations) between the different layers. Each layer has a unique ID (e.g., ID1, ID2, ID3, ID4, ID7, ID9, and ID10) and a link to its parent layer. In the following discussion, all layers (intermediate RO nodes and leaf nodes) that are derived from the same base layer (root node) are collectively referred to herein as "an image layer family". Each layer represented by the data structure 400 may further include internal metadata (e.g., bitmap and memory mapping data structures) to provide references to data (e.g., data blocks, pages, etc.) associated with the layers.

In one embodiment of the invention, the data structure 400 is generated and managed by the layer hierarchy management module 132 of the container engine layer 130 as shown in FIG. 1. The data structure 400 is utilized by the data access module 136 to perform accelerated data access operations, as will be discussed in further detail below. The data structure 400 will typically have a small memory footprint (e.g., a few KB), even with hundreds of layers. As such, the data structure 400 can be loaded into system memory and leveraged for accelerated data access operations, while maintaining a small in-memory footprint. Each hierarchical data structure for a given image layer family will be assigned a hierarchy version which represents its state change, wherein the hierarchy version number increases based on certain events. For example, a hierarchy version increase can be triggered when, e.g., an instance of a RW container layer is mounted on the image, or when a new RO image layer is added to the image in response to a "commit" operation, or when given RO image layer is modified or updated by operation of a system administrator, etc. A change in data of a given RW container layer (at a leaf node) would not trigger a hierarchy version increase until a commit is executed by the RW container layer. It is to be noted that layer commit/rebuild operations (which would trigger a hierarchy version increase) typically occur in intervals of hours or days.

As noted above, embodiments of the invention implement DRR data structures which exploit metadata of a COW "layer hierarchy" to specify data dependencies between different layers, and which serve to reduce duplicated read I/O operations and enable a single data copy w/multiple layer references. In a typical data access operation, different processes (e.g., active container instances) would access a copy of the same data block from disk and store the copy of the data block in memory. In this regard, unnecessary copies of that data block would be stored in memory under circumstance where some or all of those copies of the data block were not being modified by one or more processes. To reduce memory duplication, data structures and methods are provided to provide multiple references to a same data block copy in memory (as compared to storing multiple copies of the same data block in memory which are individually referenced for the corresponding processes which access such blocks). When a given container RW layer modifies a data block, it can then make another copy of the data block prior to the modification, and then save a modified version of the data block in memory. These concepts will now be discussed in further detail with reference to FIGS. 5, 6, 7, and 8, for example.

In one embodiment, to provide access to a single copy of data in memory (and avoid duplicating memory copies), a data reference or sharing mechanism is implemented using a set of data structures which supports multiple layer references to a single memory copy. For example, FIG. 5 schematically illustrates a set of data structures 500 to enable access to a single copy of data in memory using multiple references to the single copy of data, according to an embodiment of the invention.

Figure 5:
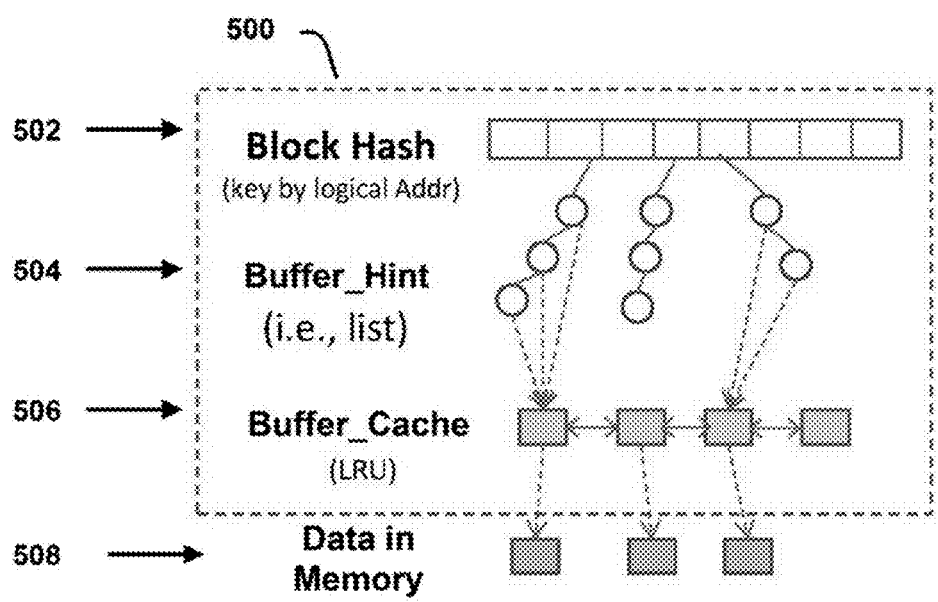
FIG. 5 schematically illustrates a set of data structures to enable access to a single copy of data in memory using multiple references to the single copy of data, according to an embodiment of the invention.

More specifically, in one embodiment as shown in FIG. 5, the data structures 500 include (i) a Block Hash data structure 502, (ii) Buffer_Hint data structures 504, and (iii) Buffer_Cache data structures 506 (collectively referred to herein as DRR data structures). In one embodiment of the invention, there is one set of data structures 500 per image layer family, and these data structures are generated and managed by the DRR management module 134 of the container engine layer 130 shown in FIG. 1. In general, the Block Hash data structure 502 comprises metadata that is used to access a Buffer_Hint data structure based on a block address (BLK_ADDR) and a current layer identifier (C_ID), which are provided by an active container layer requesting access to a data block at the given block address (e.g., the Block_Hash data structure is keyed by logical addresses). As schematically illustrated in FIG. 5, each Buffer_Hint data structure 504 provides a soft reference to a given data block, in particular, a reference to one Buffer_Cache data structure which is directly mapped to one data block in memory. Each Buffer_Cache data structure 506 provides a hard reference to a data block 508 stored in memory (i.e., a 1:1 mapping to data content). Example instances of Buffer_Hint and Buffer_Cache data structures will now be explained in further detail with reference to FIGS. 6 and 7.

Figure 6:
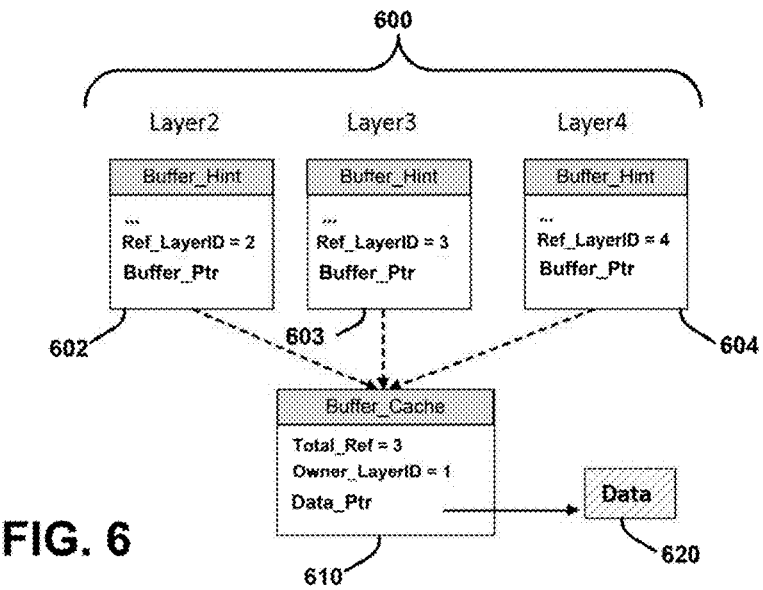
FIG. 6 illustrates data structures that are used to provide multiple layer references to a single copy of data in memory, according to an embodiment of the invention.

FIG. 6 illustrates data structures that are used to provide multiple layer references to a single copy of data in memory, according to an embodiment of the invention. In particular, FIG. 6 schematically illustrates a method to save memory and reduce duplicated reads from disk by storing a single data block in memory with multiple references to that single data block from different image layers, according to an embodiment of the invention. FIG. 6 shows a plurality of Buffer_Hint data structures 600 that point to the same Buffer_Cache data structure 610. The Buffer_Hint data structures 600 include Buffer_Hint data structures 602, 603, and 604 which are associated with Layers 2, 3 and 4, respectively.

In one embodiment of the invention, a Buffer_Hint data structure comprises various parameters, including, but not limited to a Ref_LayerID parameter and a Buffer_Ptr parameter. Further, in one embodiment, a Buffer_Cache data structure comprises various parameters, including, but not limited to, a Total_Ref parameter, an Owner_LayerID parameter, and a Data_Ptr parameter. The Ref_LayerID parameter of a given Buffer_Hint data structure comprises an identifier that identifies the image layer associated with the given Buffer_Hint data structure. In one embodiment, each image layer comprises at most one Buffer_Hint data structure per each data block that exists in memory at a given time. The Buffer_Ptr parameter of a given Buffer_Hint data structure comprises a pointer which references the Buffer_Cache data structure that points to the data block.

The Total_Ref parameter of a given Buffer_Cache data structure provides a count of the number of Buffer_Hint data structures that reference (or point to) the given Buffer_Cache data structure. The Owner_LayerID parameter of the given Buffer_Cache data structure comprises an identifier which identifies the image layer that "owns" the data block pointed to by the given Buffer_Cache data structure. The Data_Ptr parameter of a given Buffer_Cache data structure comprises a pointer that points to a single data block stored in memory, which is directly associated with the given Buffer_Cache data structure. Optionally, other information such as an oldest and/or newest reference layer info (ID or timestamp etc.) can be maintained in a Buffer_Cache, which can be utilized to accelerate a lookup operation of an image layer hierarchy.

FIG. 6 illustrates an example embodiment in which image Layers 2, 3 and 4 share a same data block 620 in memory, but wherein the in-memory data block 620 is "owned" by Layer 1, i.e., the data block 620 is read from Layer 1. The data block 620 is not directly pointed to by the Buffer_Hint data structures 600. Instead, each Buffer_Hint data structure 602, 603, and 604 provides a reference (e.g., Buffer_Ptr parameter) to the Buffer_Cache data structure 610 corresponding to the data block 620, wherein the Buffer_Cache data structure 610 provides a reference (e.g., Data_Ptr parameter) to the data block 620 in memory (e.g., a 4 KB or 8 KB data block). As further shown in FIG. 6, the Total_Ref parameter of the Buffer_Cache data structure 610 is equal to 3, which means that the data block 620 is referenced by the Buffer_Hint data structures of 3 image layers (e.g., Layers 2, 3 and 4 in the example of FIG. 6).

The Buffer_Hint data structures are dynamically generated and deleted during real-time operation when one or more active RW container instances mounted on one or more RO layers of a give image proceed to read and/or write data associated with the given image. For example, whenever an active RW container layer issues a data read request for a given data block starting at a given image layer, a new Buffer_Hint data structure can be generated for the given data block (as a result of the look up operation) to reference a Buffer_Cache data structure (either newly generated or existing) that points to the given data block.

For example, in the illustrative embodiment of FIG. 6, assume that an active RW container layer mounted on image layer L5 issues a read request for the given data block 620 pointed to by the Buffer_Cache 610. As the data access operation proceeds (using process flows discussed below), it will eventually be determined that the given data block 620 already exists in memory. As such, a new Buffer_Hint data structure can be generated with a parameter Ref_LayerID=5 and with a Buffer_Ptr parameter that points to the existing Buffer_Cache data structure 610. The Total_Ref parameter of the Buffer_Cache data structure 610 would be incremented by 1 (i.e., changed from 3 to 4). This would allow the data read process to access and return a copy of the data block 620 in memory, thereby avoiding the need to read a copy of the same data block from disk and store a duplicate of the same data block in memory.

On the other hand, the Total_Ref parameter of a given Buffer_Cache data structure will decrease by 1 when a given Buffer_Hint data structure no longer points to the Buffer_Cache data structure (referred to as a "de-reference" operation). A de-reference operation occurs when, for example, a given RW container layer deletes a given data block or the given data block is paged-out, such that the Buffer_Hint associated with that data block is deleted. The data block would still remain in memory until the Total_Ref parameter (of the Buffer_Cache data structure that points to the data block) decreases to Total_Ref=0.

By way of further example, in the illustrative embodiment of FIG. 6, if a given RW container layer mounted on one of the image layers (Layer 2, Layer 3 or Layer 4) performs a data write operation to update or modify the data block 620, the existing Buffer_Hint and Buffer_Cache data structures 600 and 610 would be modified/updated, and new Buffer_Hint and Buffer_Cache data structures would be created (as discussed below with reference to FIG. 7). In FIG. 6, the Owner_LayerID parameter of the Buffer_Cache data structure 610 is not equal to any of the Ref_LayerID parameters of the Buffer_Hint data structures 600, which means that the data block 620 has not be changed by any of the reference layers since the data block 620 was read from disk, because any change to the data block would result in a memory COW process, as shown in FIG. 7.

Figure 7:
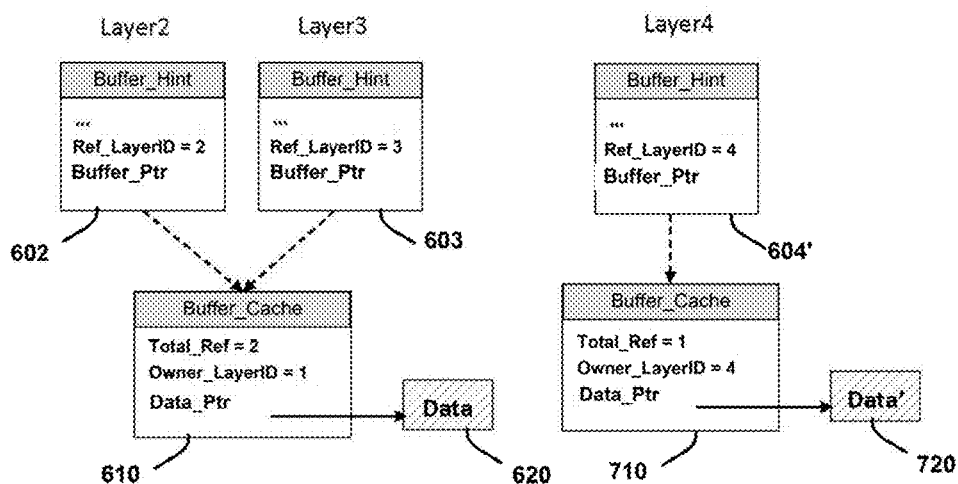
FIG. 7 schematically illustrates a method for updating the data structures of FIG. 6 based on a COW operation, according to an embodiment of the invention.

FIG. 7 schematically illustrates a method for updating the data structures of FIG. 6 based on a COW operation, according to an embodiment of the invention. In FIG. 6, any one of the reference layers (Layer 2, Layer 3 or Layer 4) may update the data block 620 independently and thus break the data sharing reference. Such update will trigger a memory COW operation when the Ref_LayerID parameter of the reference layer making the update is not equal to the Owner_LayerID parameter of the Buffer_Cache data structure 610. For example, assume that the reference Layer 4 wants to change the data block 620 given the state of the data sharing/references shown in FIG. 6. In this example, since Layer 1 owns the data block 620 (i.e., Owner_LayerID=1), a COW process is performed (via the data access module 136, FIG. 1) as follows.

As an initial step, the data access module 136 will determine whether the data block 620 is shared or exclusively owned by the requesting reference layer. In particular, the data access module 136 will utilize the Buffer_Ptr parameter of the Buffer_Hint data structure 604 to locate the Buffer_Cache data structure 610 which directly points to the in-memory copy of the data block 620. The data access module 136 will then check the value of the Total_Ref parameter of the Buffer_Cache data structure 610. If Total_Ref=1, the data access module 136 will conclude that that the reference Layer 4 exclusively owns the in-memory copy of the data block 620 and, therefore, the reference Layer 4 can modify the data block 620 without performing a COW operation. On the other hand, if Total_Ref>1, the data access module 136 will conclude that another layer (besides Layer 4) is also referencing the data block 620 (i.e., the in-memory copy of the data block 620 is shared). In this instance, a COW process is performed by updating and adding new data structures as shown in FIG. 7.

For example, in one embodiment, a COW process begins by the data access module 136 (FIG. 1) allocating a new data block on disk and a new page in memory for a modified data block 720 (a copy-modify can be issued for a partial write). The DRR management module 134 (FIG. 1) allocates a new Buffer_Cache data structure 710 and sets the relevant parameters of the new Buffer_Cache data structure 710 as follows: Total_Ref=1, Owner_LayerID=4, and Buffer_Ptr→new block address of data block 720. Moreover, the Buffer_Ptr parameter of the Buffer_Hint data structure 604 (for Layer 4) is updated to reference (or otherwise point to) the new Buffer_Cache data structure 720. In addition, the Buffer_Cache data structure 610 (for the original data block 620) is updated by decreasing the reference count by one (from 3 to 2) such that Total_Ref=2, as shown in FIG. 7. In one embodiment, a journaling log may be utilized during the data structure update process to ensure metadata change consistency.

In the example process shown in FIG. 7, the original copy of the data block 620 is maintained in memory since the data block 620 is still referenced by Layers 2 and 3. Either Layer 2 or Layer 3 can issue a write request to modify the data block 620, and such request would trigger a COW operation as discussed above. In the state shown in FIG. 7, Layer 4 could further modify the data block 720 without triggering a COW process because Layer 4 fully owns the data block 720 (Ref_LayerID=Owner_LayerID=4) and no other reference to the data block 720 exists (Total_Ref=1).

With the example data structures and reference mechanisms discussed above, a separate lookup record cache is not maintained with the above owner layer ID and reference layer ID metadata. Instead, the metadata is embedded into data cache structures and routines, which enable multiple references to a single in-memory copy of a data block in a unified fashion and a tracking mechanism that leads to a reduction in duplicated disk read I/O operations and duplicated copies of data blocks in memory.

Figure 8:
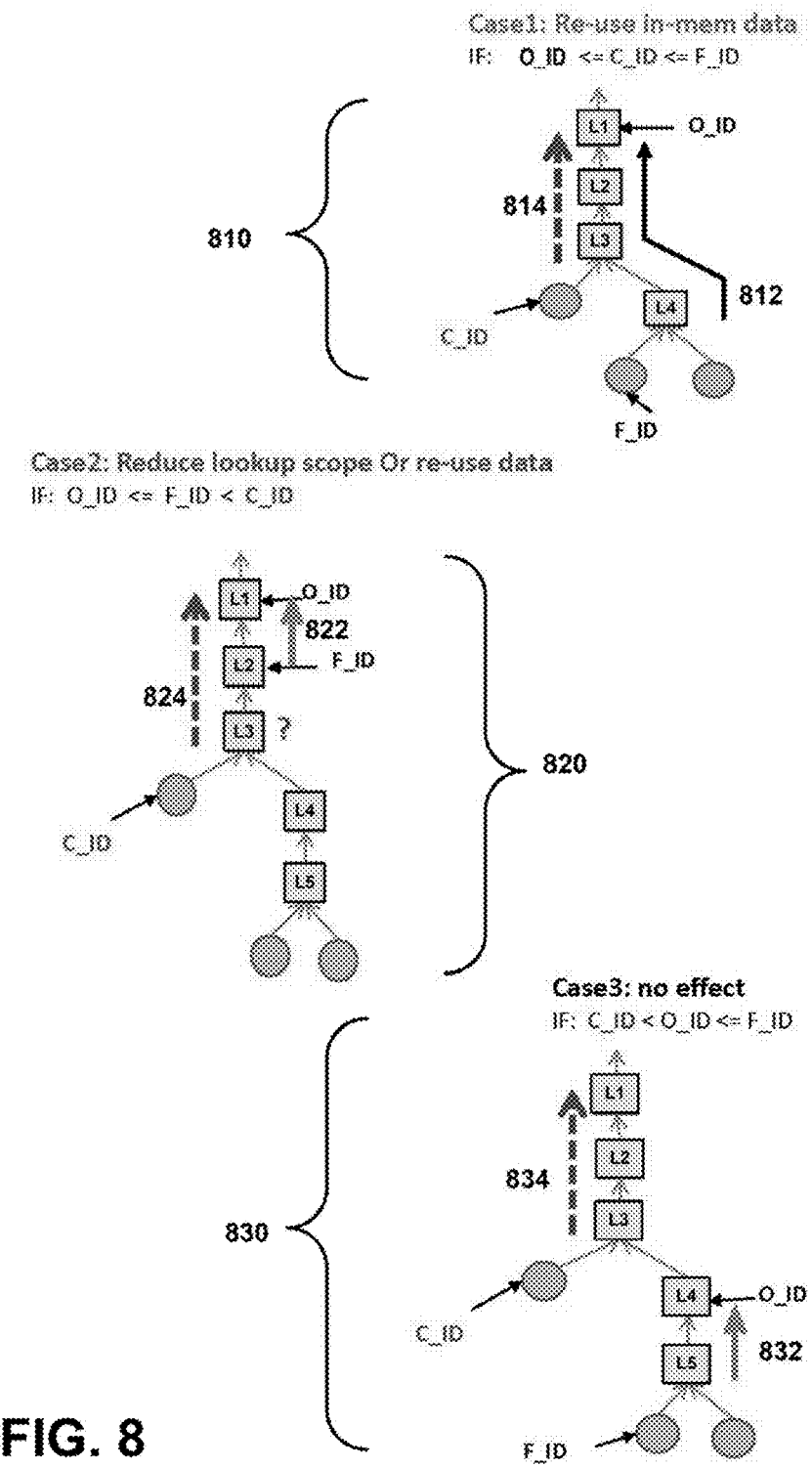
FIG. 8 schematically illustrates various methods for traversing an image layer hierarchy using data structures that support accelerated data access operations, according to embodiments of the invention.

FIG. 8 schematically illustrates various methods for traversing an image layer hierarchy using data structures that support accelerated data access operations, according to embodiments of the invention. In particular, FIG. 8 schematically illustrates methods for traversing layers of an image using an image layer hierarchy data structure, and Buffer_Hint/Buffer_Cache data structures, such as discussed above with reference to FIGS. 4, 5, 6, and 7, for example. In the following description, the term O_ID denotes an identifier of a layer that owns a data block (e.g., the Owner_LayerID parameter of a Buffer_Cache data structure) which is the target of a data access operation. In addition, the term F_ID denotes an identifier of a layer that is furthest from the owner layer O_ID along a known result path. For example, in one embodiment, F_ID corresponds to the Ref_LayerID of a Buffer_Hint data structure. Moreover, the term C_ID denotes a current layer identifier (i.e., an identifier of an active container layer currently requesting access to a data block). An active RW container layer is considered a writeable instance of given RO layer on which the active RW container layer is mounted. For example, as noted above with reference to FIG. 3, the RW container layer 302 is a writeable instance of image layer L5.

FIG. 8 illustrates different lookup methods 810, 820 and 830 for traversing layers of an image layer hierarchy in response to a data access request by an active RW container layer, based on a relationship between the identifiers C_ID, O_ID, and F_ID. For example, as explained in further detail below, the method 810 illustrates an accelerated data access operation which is implemented when O_ID≤C_ID≤F_ID. The method 810 allows an active RW container layer to directly access (or re-use) an in-memory copy of a data block in memory without having to traverse the image layer hierarchy. The method 820 illustrates an accelerated data access operation which is implemented when O_ID≤F_ID≤C_ID. The method 820 provides a reduced scope for traversing the image layer hierarchy in conjunction with re-use of an in-memory copy of a target data block. The method 830 illustrates a normal data access operation which is implemented when C_ID<O_ID≤F_ID.

In particular, the method 810 in FIG. 8 shows an image layer hierarchy comprising RO image layers L1, L2, L3 and L4, and active RW container layers with identifiers C_ID and F_ID mounted on respective image layers L3 and L4. A solid line 812 denotes a known result path L4→L3→L2→L1 of a previous lookup operation performed by the active RW container layer F_ID in which a target data block was found at image layer L1 after traversing the image layers along the L4→L3→L2→L1 path. In this example, the active RW container layer F_ID is a writeable instance of image layer L4, and the image layer L4 would have a block reference (e.g., Buffer_Hint with Ref_LayerID=4) to the image layer L1 O_ID which is deemed to own the target data block. A Buffer_Cache data structure would exist with an Owner_LayerID=1 and a Data_Ptr parameter that points to the target data block in memory.

The method 810 further illustrates an example where the active RW container layer C_ID (writeable instance of image layer L3) issues a new request to read the same target data block that was found (and stored in memory) from the previous lookup operation, i.e., the known result path 812. In the absence of the metadata associated with the known result path 812, the active RW container layer C_ID would have to traverse the path L3→L2→L1 (as indicated by the dashed line 814) to find the same data block. However, since the lookup path 814 is a subset of the known result path 812, it is not necessary to perform a lookup operation to find the same data block by traversing path L3→L2→L1 because the lookup result for that path L3→L2→L1 is already known by virtue of the previous lookup result for the known path 812. In this example, it is assumed that O_ID=1, F_ID=4, and C_ID=3, wherein (O_ID=1)≤(C_ID=3)≤(F_ID=4). Therefore, in this example, no traversal is needed, since the active RW container layer C_ID can simply access and re-use the existing data block in memory which is referenced by the Buffer_Cache data structure for Owner_LayerID=1. A new Buffer_Hint data structure with Ref_LayerID=3 would be generated, with the new Buffer_Hint data structure pointing to the Buffer_Cache data structure for the target data block.

Next, the method 820 in FIG. 8 shows an image layer hierarchy comprising RO image layers L1, L2, L3, L4, and L5, an active RW container layer with an identifier C_ID mounted on image layer L3, and other active RW container layers (leaf nodes) mounted on image layer L5. A solid line 822 denotes a known result path L2→L1 of a previous lookup operation performed by an active RW container layer (not shown) in which a target data block was found at image layer L1 after traversing the image layers along the path L2→L1. In this example, the image layer L2 (with identifier F_ID) would have a block reference (e.g., Buffer_Hint with Ref_LayerID=2) to the image layer L1 O_ID which is deemed to own the target data block. A Buffer_Cache data structure would exist with an Owner_LayerID=1 and a Data_Ptr parameter that points to the target data block in memory.

The method 820 further illustrates an example where the active RW container layer C_ID (writeable instance of image layer L3) issues a new request to read the same target data block that was found (and stored in memory) from the previous lookup operation, i.e., the known result path 822. Since the image layer L2 (denoted as F_ID) in this example would have a block reference to the image layer L1 (O_ID, owner), thereby indicating that the path L2→L1 has already been traversed, the data access request from the active RW container layer C_ID would not need to traverse the known result path 822 (path L2→L1). More specifically, in the absence of metadata associated with the known result path 822, the active RW container layer C_ID would have to traverse the path L3→L2→L1 (as indicated by the dashed line 824) to find the same data block.

In this example, however, it is assumed that O_ID=1, F_ID=2, and C_ID=3, wherein (O_ID=1)≤(F$_{ID}$=2)≤(C$_{ID}$=3). In this regard, since a portion of the lookup path 824 includes the known result path 822, it may not be necessary to perform a lookup operation to find the same data block by traversing the entire path L3→L2→L1. Instead, a lookup operation would be performed to determine if the target data block is served from the image layer L3. If the target data block is found in the image layer L3, the data block would be read from disk, and then returned. On the other hand, if the target data block is not found in the image layer L3, the lookup operation would not traverse the known result path 822. Rather, the active RW container layer C_ID can simply use the known result path 822 to access and re-use the existing data block in memory which is referenced by the Buffer_Cache data structure for Owner_LayerID=1. A new Buffer_Hint data structure with Ref_LayerID=3 would be generated, with the new Buffer_Hint data structure pointing to the Buffer_Cache data structure for the target data block.

Next, the method 830 in FIG. 8 shows an image layer hierarchy comprising RO image layers L1, L2, L3, L4, and L5, and active RW container layers with identifiers C_ID and F_ID mounted on image layers L3 and L5, respectively. A solid line 832 denotes a known result path L5→L4 of a previous lookup operation performed by an active RW container layer in which a target data block was found at image layer L4 after traversing the image layers along the path L5→L4. In this example, the image layer L5 (with identifier F_ID) would have a block reference (e.g., Buffer_Hint with Ref_LayerID=4) to the image layer L4 O_ID which is deemed to own the target data block. A Buffer_Cache data structure would exist with an Owner_LayerID=4 and a Data_Ptr parameter that points to the target data block in memory.

The method 830 further illustrates an example where the active RW container layer C_ID (writeable instance of image layer L3) issues a new request to read the same target data block that was found (and stored in memory) from the previous lookup operation, i.e., the known result path 832. In this example, it is assumed that O_ID=4, F_ID=5, and C_ID=3, wherein (C_ID=1)<(O_ID=4)≤(F_ID=5). In this instance, a lookup path 834 (L3→L2→L1) does not overlap or otherwise include the known result path 832. As such, no accelerated data access operation is performed. Instead, the data access operation proceeds to traverse the layers L3→L2→L1 along the lookup path 834 until the target data block is found.

Figure 9:
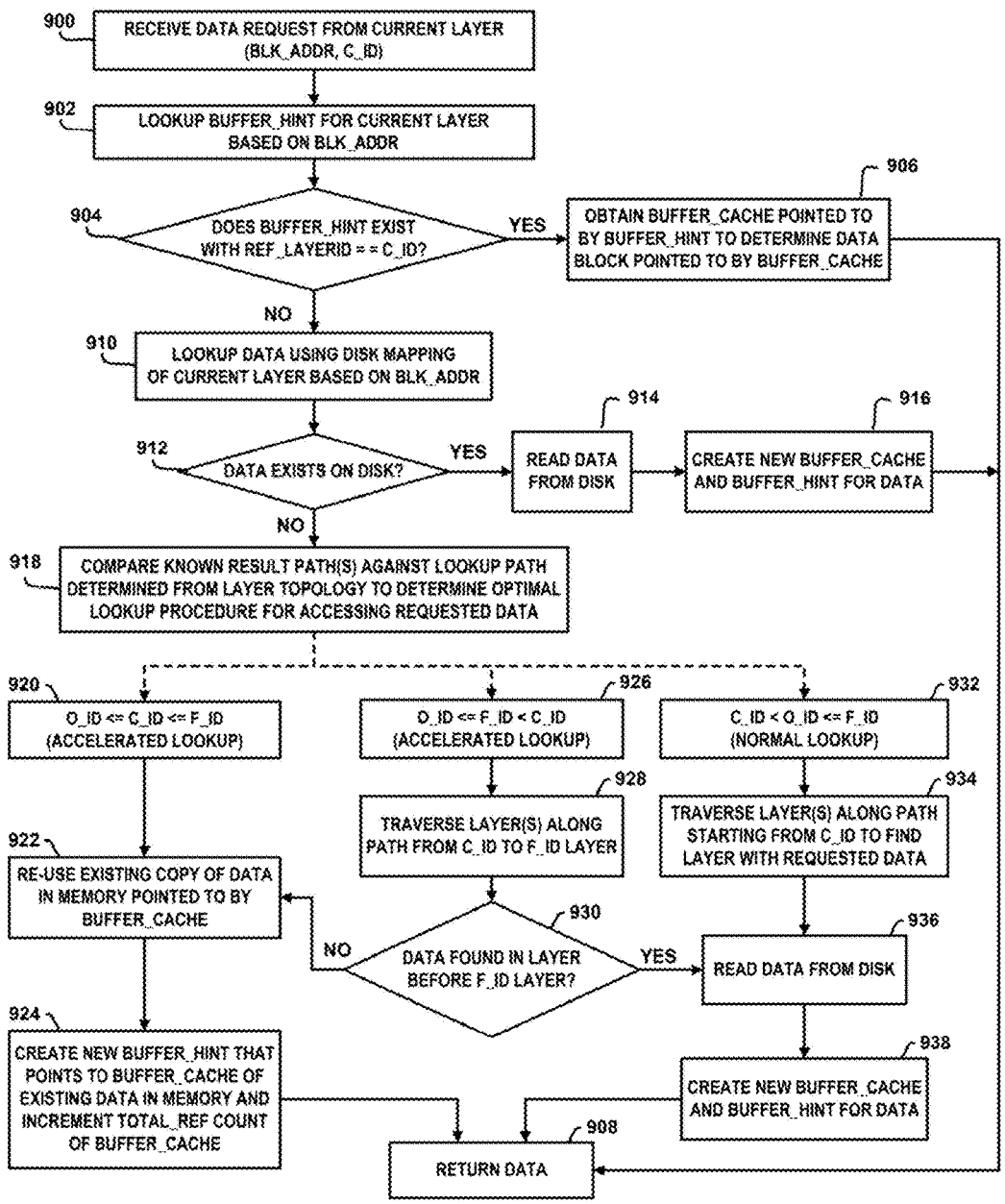
FIG. 9 is a flow diagram of a method for performing an accelerated data access operation according to an embodiment of the invention.

FIG. 9 is a flow diagram of a method for performing a data access operation according to an embodiment of the invention. In particular, FIG. 9 is a flow diagram that illustrates details of an overall process flow for performing an accelerated data read operation based on the methods discussed above in connection with FIGS. 5-8. For illustrative purposes, the method of FIG. 9 will be discussed with reference to the system of FIG. 1, wherein accelerated data access operations are implemented by various modules of the container engine layer 130. As an initial step, the data access module 136 (which implements a storage driver) will receive a data request from an active container having a RW container layer mounted on a given layer of an image (block 900). In one embodiment, the data request comprises a block address (BLK_ADDR) of a target data block and an identifier, C_ID, which identifies the RW container layer that is currently requesting access to the target data block.

In response to the data request, the data access module 136 proceeds to determine if the target data block has previously been accessed and stored in memory or paged-out on disk for the current layer C_ID. In particular, the data access module 136 will access the DRR data structures to lookup a Buffer_Hint data structure for the current layer C_ID based on the BLK_ADDR (block 902). In one embodiment of the invention, this lookup process is performed using a Block Hash data structure (e.g., data structure 502, FIG. 5) which comprises metadata that is used to lookup a Buffer_Hint data structure in memory which is associated with the block address of the target data block. If a Buffer_Hint data structure is found with a Ref_LayerID equal to the current layer C_ID (affirmative determination in block 904), the Buffer_Ptr parameter of the Buffer_Hint data structure is used to access a Buffer_Cache data structure that is referenced by Buffer_Hint data structure, and the Data_Ptr parameter of the Buffer_Cache data structure is used to find the target data block in memory (block 906). The target data block in memory (cache) is then returned to the current layer C_ID (block 908).

On the other hand, if a Buffer_Hint data structure is not found with a Ref_LayerID equal to the current layer C_ID (negative determination in block 904), the process proceeds to lookup the data block using a disk mapping of the current layer C_ID based on the block address of the target data block (block 910). This step determine if the target data block exists on disk under circumstances in which the target data block may have previously existed in memory for the current layer C_ID, but was paged-out to disk. If the target data block is determined to exist on disk (affirmative determination in block 912), the target data block is read from disk (block 914), a new Buffer_Cache data structure and Buffer_Hint data structure are created for the data block (block 916), and the target data block is returned (block 908). In this instance, the target data block (requested by the current layer C_ID) would be stored in memory, along with a new Buffer_Hint data structure with a Ref_LayerID=C_ID, and a Buffer_Cache data structure with Owner_LayerID=C_ID.

The process flow of steps 902-916 discussed above are initially performed to lookup the current layer C_ID itself to determine if the target data block has previously been read by the current layer C_ID in which case the target data block for the current layer C_ID could be accessed from cache or disk. If it is determined that the data block does not exist in memory or on disk for the current layer C_ID (negative determination in blocks 904 and 912), this means that the target data block has not been previously accessed by the current layer C_ID, and the data access operation proceeds to access the target data block as follows.

As an initial step, the data access module 136 will access the relevant layer hierarchy data structure for the given image (as generated by the layer hierarchy management module 132) and the DRR data structures (as generated by the DRR management module 134), and then compare known result paths (as indicated by existing data reference relationships (Buffer_Hint and Buffer_Cache data structures) generated from previous lookup operations for the target data block) against a lookup path the target data block (as determined from the image layer hierarchy data structure) to determine an optimal lookup process to access the target data block (block 918). In one embodiment of the invention, the comparison process of block 918 is implemented using the techniques discussed above with reference to FIG. 8, wherein a lookup process for traversing the RO layers of the image is based on a relationship between the identifiers C_ID, O_ID, and F_ID. As part of this process, a Block Hash data structure (e.g., data structure 502, FIG. 5) can be used to identify one or more Buffer_Hint data structures (and corresponding Buffer_Cache data structures) that may exist in memory, which are associated with the block address of the target data block. The identifiers O_ID and F_ID for known result paths can then be identified based on the Buffer_Hint and Buffer_Cache data structures, if any, that are associated with the target data block, and then an optimal lookup process can be performed.

For example, if it is determined (in block 918) that O_ID≤C_ID≤F_ID, an accelerated lookup process is performed (block 920) which is similar to method 810 of FIG. 8, wherein the accelerated lookup process comprises accessing and re-using an existing copy of the target data block in memory (which is pointed to by an associated Buffer_Cache data structure) without having to traverse any of the RO image layers (block 922). With this accelerated lookup process, a new Buffer_Hint data structure is generated and the existing Buffer_Cache data structure for the target data block is updated (block 924). In particular, a new Buffer_Hint data structure will be generated with a Ref_LayerID=C_ID and a Buffer_Ptr which points to the existing Buffer_Cache data structure which, in turn, points to the target data block in memory. In addition, the Total_Ref count of the existing Buffer_Cache data structure (of the target data block) is increased by 1 to reflect the new Buffer_Hint data structure for the current layer C_ID that references the Buffer_Cache data structure. The target data block is then returned to the requesting layer (block 908).

Alternatively, if it is determined (in block 918) that O_ID≤F_ID≤C_ID, an accelerated lookup process is performed (block 926) which is similar to the method 820 of FIG. 8, wherein the accelerated lookup process comprises a reduced scope for traversing the image layer hierarchy in conjunction with re-use of an in-memory copy the target data block. More specifically, the accelerated lookup process comprises traversing the image layers along a shortened lookup path from the current layer C_ID to the far-most layer F_ID of a known result path to determine if the target data block exists in one of the layers along that shortened lookup path (block 928). If the target data block is found in an image layer before the far-most layer F_ID (affirmative determination in block 930), the metadata for that layer (e.g., disk mapping metadata) is used to read the target data block from disk (block 936). A new Buffer_Cache data structure and Buffer_Hint data structure are then created to reference the in-memory copy of the target data block (block 938), and the target data block is returned (block 908). More specifically, in this instance, the target data block for the current layer C_ID would be stored in memory, along with a new Buffer_Hint data structure with a Ref_LayerID=C_ID, and a Buffer_Cache data structure with Owner_LayerID=C_ID.

On the other hand, if the target data block is not found in an image layer before reaching the far-most layer F_ID (negative determination in block 930), the traversal process terminates, and the lookup operation will proceed to utilize a Buffer_Hint data structure of the far-most layer F_ID to identify the Buffer_Cache data structure referenced by the Buffer_Hint data structure, and then access and re-use an existing copy of the target data block in memory which is pointed to by the Buffer_Cache data structure (block 922). With this accelerated lookup process, a new Buffer_Hint data structure is generated and the existing Buffer_Cache data structure for the target data block is updated (block 924), as described above. In particular, a new Buffer_Hint data structure will be generated with a Ref_LayerID=C_ID and a Buffer_Ptr which points to the existing Buffer_Cache data structure which, in turn, points to the target data block in memory. In addition, the Total_Ref count of the existing Buffer_Cache data structure (of the target data block) is increased by 1 to reflect the new Buffer_Hint data structure for the current layer C_ID that references the Buffer_Cached data structure. The target data block is then returned to the requesting layer (block 908).

Alternatively, if it is determined (in block 918) that C_ID<O_ID≤F_ID, a normal data lookup process is performed (block 932) which is similar to the method 830 of FIG. 8, wherein the lookup process traverses the image layer hierarchy starting from the current layer C_ID to find the image layer having the target data block (block 934). Once the target data block is found on a given image layer, the data block is read from disk using the disk mapping metadata the given image layer (block 936). A new Buffer_Cache data structure and Buffer_Hint data structure are created to reference the in-memory copy of the target data block (block 938), and the target data block is returned (block 908). More specifically, in this instance, the target data block for the current layer C_ID would be stored in memory, along with a new Buffer_Hint data structure with a Ref_LayerID=C_ID, and a Buffer_Cache data structure with Owner_LayerID=C_ID.

It is to be appreciated that there are various advantages associated with the systems and methods for accelerating data access operations according to embodiments of the invention as discussed herein. For example, the exemplary systems and methods discussed herein exploit an existing layer hierarchy to accelerate lookup operations. Indeed, a built-in layer hierarchy (such as shown in FIG. 4) has a limited memory footprint, and is particularly useful with applications such as Docker wherein (i) active RW container layers (sitting at a leaf nodes) mounted on a given image layer typically issue the same IO requests; (ii) "commit" operations, which modify the existing layer hierarchy, are infrequent (hours or days) and (iii) each "commit" would trigger a COW operation to generate a new layer, wherein such COW operation can be accelerated using the techniques discussed herein.

Moreover, the DRR data structures discussed herein allow for multiple references (across various image layers) to a single in-memory copy of data. Once a new data block is read from a specific layer, the Owner_LayerIDs and Ref_LayerIDs are tracked in data caching structures (e.g., Buffer_Hint and Buffer_Cache data structures), wherein the use of these data caching structures eliminates duplicated read IO operations and reduce memory usage by virtue of having data structures to provide multiple preferences to a single in-memory copy of a data block.

Furthermore, the techniques discussed herein can be implemented as "add-on" modules which can re-use an existing COW infrastructure. Indeed, the DRR data structures and associated acceleration framework can be integrated with existing COW systems, wherein the DRR data structures can readily exploit layer hierarchy to accelerate COW data access across layers (either re-use existing in-memory data (reduce IO operations) or reduce lookup scope). As noted above, the acceleration frameworks discussed herein can be readily integrated with existing COW protocols, including, but not limited to, COW based Docker (e.g., DeviceMapper, AUFS), COW based array snapshot (e.g., XtremIO snap, VNX SnapSure), or COW based VM snap (e.g., VMWare snapshot).

While FIG. 1 shows one example embodiment of a computing system (e.g., an application server node), it is to be understood that the term "computing system" as used herein is intended to be broadly construed so as to encompass, for example, any system comprising multiple networked processing devices such as a datacenter, cloud computing system, or enterprise network, etc. For example, FIG. 10 schematically illustrates a network computing environment 1000 in which the computing system of FIG. 1 can be implemented, according to an embodiment of the invention.

The network computing environment 1000 in this embodiment comprises a plurality of processing devices 1002-1, 1002-2, 1002-3, ... 1002-N (or processing devices 1002) which communicate with one another over a network 1004. It is to be appreciated that the computing system of FIG. 1 can be implemented one or more of the processing devices 1002 or executed in a distributed manner across two or more of the processing devices 1002. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 10, such a device generally comprises at least one processor and an associated memory, and implements one or more functional modules for instantiating and/or controlling features of systems and methodologies described herein. Multiple elements or modules may be implemented by a single processing device in a given embodiment.

Figure 10:
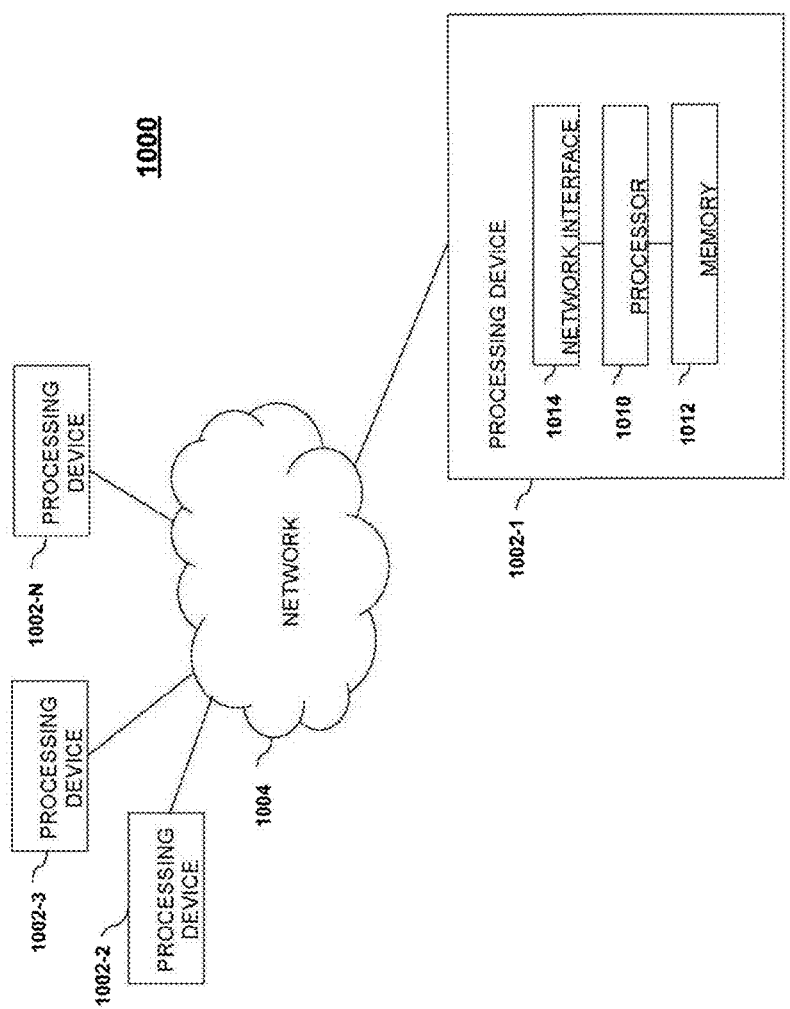
FIG. 10 schematically illustrates a network computing environment in which the computing system of FIG. 1 can be implemented, according to an embodiment of the invention.

In particular, the processing device 1002-1 shown in FIG. 10 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random access memory (RAM), read-only memory (ROM) or other types of memory, in any combination. The one or more software programs when executed by a processing device such as the processing device 1002-1 causes the device to perform functions associated with one or more of the components/steps of system/methodologies shown in the accompanying Figures. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the network 1004 and other system components. Such circuitry may comprise conventional transceivers of a type well known in the art.

The other processing devices 1002-2, 1002-3, ... 1002-N) of the network computing environment 1000 are assumed to be configured in a manner similar to that shown for computing device 1002-1 in FIG. 10.

The network computing environment 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in the network computing environment 1000. Such components can communicate with other elements of the network computing environment 1000 over any type of network, such as a wide area network (WAN), a local area network (LAN), a satellite network, a telephone or cable network, or various portions or combinations of these and other types of networks.

Furthermore, it is to be appreciated that the network computing environment 1000 of FIG. 10 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. The network computing environment 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the network computing environment 1000 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
loading an image into main memory of a computing system, the image comprising a plurality of image layers, wherein the plurality of image layers comprises a base image layer which references a plurality of data blocks, and at least one additional image layer which references a modified version of at least one data block referenced in the base image layer;
receiving a request for a target data block referenced by a given image layer of the image from a first process operating on the image;
accessing data structures associated with the target data bock, wherein the data structures comprise metadata of a previous lookup path that was previously traversed by a second process across one or more of the image layers of the image to access the target data block and to store a copy of the target data block in the main memory;
utilizing the metadata of the data structures to access the copy of the target data block in the main memory without having to traverse the previous lookup path across the one or more image layers of the image to access the target data block; and
returning the copy of the target data block to the first process.

2. The method of claim 1, wherein the first process operating on the image comprises an active container instance comprising a read/write container layer mounted on one of the image layers of the image.

3. The method of claim 1, wherein the data structures provide multiple image layer references to the copy of the target data block in the main memory.

4. The method of claim 1, wherein the data structures comprise a first data structure and a second data structure;
wherein the first data structure comprises an identifier of an image layer included in the previous lookup path, and a pointer to the second data structure; and
wherein the second data structure comprises a pointer to the copy of the target data block in the main memory, and an identifier of the image layer of the image which owns the target data block.

5. The method of claim 4, wherein the second data structure further comprises a count of a number of first data structures that reference the second data structure.

6. The method of claim 1, wherein utilizing the metadata of the data structures to access the copy of the target data block in the main memory without having to traverse the previous lookup path comprises utilizing the metadata of the data structures to directly access the copy of the target data block in the main memory without having to traverse any of the image layers of the image.

7. The method of claim 1, wherein utilizing the metadata of the data structures to access the copy of the target data block in the main memory without having to traverse the previous lookup path comprises:
traversing at least one image layer of the image along a current lookup path determined from a hierarchical data structure that represents the image to find the target data block, wherein the current lookup path comprises the previous lookup path; and
utilizing the metadata of the data structures to access the copy of the target data block in the main memory without traversing the previous lookup path when the target data block is not found by traversing the at least one image layer of the image along the current lookup path.

8. An article of manufacture comprising a processor-readable storage medium having stored therein program code of one or more software programs, wherein the program code is executable by one or more processors to implement a method comprising:

loading an image into main memory of a computing system, the image comprising a plurality of image layers, wherein the plurality of image layers comprises a base image layer which references a plurality of data blocks, and at least one additional image layer which references a modified version of at least one data block referenced in the base image layer;

receiving a request for a target data block referenced by a given image layer of the image from a first process operating on the image;

accessing data structures associated with the target data bock, wherein the data structures comprise metadata of a previous lookup path that was previously traversed by a second process across one or more of the image layers of the image to access the target data block and to store a copy of the target data block in the main memory;

utilizing the metadata of the data structures to access the copy of the target data block in the main memory without having to traverse the previous lookup path across the one or more image layers of the image to access the target data block; and returning the copy of the target data block to the first process.

9. The article of manufacture of claim 8, wherein the first process operating on the image comprises an active container instance comprising a read/write container layer mounted on one of the image layers of the image.

10. The article of manufacture of claim 8, wherein the data structures provide multiple image layer references to the copy of the target data block in the main memory.

11. The article of manufacture of claim 8, wherein the data structures comprise a first data structure and a second data structure;

wherein the first data structure comprises an identifier of an image layer included in the previous lookup path, and a pointer to the second data structure; and wherein the second data structure comprises a pointer to the copy of the target data block in the main memory, and an identifier of the image layer of the image which owns the target data block.

12. The article of manufacture of claim 11, wherein the second data structure further comprises a count of a number of first data structures that reference the second data structure.

13. The article of manufacture of claim 8, wherein utilizing the metadata of the data structures to access the copy of the target data block in the main memory without having to traverse the previous lookup path comprises utilizing the metadata of the data structures to directly access the copy of the target data block in the main memory without having to traverse any of the image layers of the image.

14. The article of manufacture of claim 8, wherein utilizing the metadata of the data structures to access the copy of the target data block in the main memory without having to traverse the previous lookup path comprises:

traversing at least one image layer of the image along a current lookup path determined from a hierarchical data structure that represents the image to find the target data block, wherein the current lookup path comprises the previous lookup path; and utilizing the metadata of the data structures to access the copy of the target data block in the main memory without traversing the previous lookup path when the target data block is not found by traversing the at least one image layer of the image along the current lookup path.

15. A system, comprising:

at least one processor; and memory configured to store program code, wherein the program code is executable by the at least one processor to:

load an image into main memory of a computing system, the image comprising a plurality of image layers, wherein the plurality of image layers comprises a base image layer which references a plurality of data blocks, and at least one additional image layer which references a modified version of at least one data block referenced in the base image layer;

receive a request for a target data block referenced by a given image layer of the image from a first process operating on the image;

access data structures associated with the target data bock, wherein the data structures comprise metadata of a previous lookup path that was previously traversed by a second process across one or more of the image layers of the image to access the target data block and to store a copy of the target data block in the main memory;

utilize the metadata of the data structures to access the copy of the target data block in the main memory without having to traverse the previous lookup path across the one or more image layers of the image to access the target data block; and return the copy of the target data block to the first process.

16. The system of claim 15, wherein the first process operating on the image comprises an active container instance comprising a read/write container layer mounted on one of the image layers of the image.

17. The apparatus of claim 15, wherein the data structures provide multiple image layer references to the copy of the target data block in the main memory.

18. The system of claim 15, wherein the data structures comprise a first data structure and a second data structure;

wherein the first data structure comprises an identifier of an image layer included in the previous lookup path, and a pointer to the second data structure; and wherein the second data structure comprises a pointer to the copy of the target data block in the main memory, an identifier of the image layer of the image which owns the target data block, and a count of a number of first data structures that reference the second data structure.

19. The system of claim 15, wherein utilizing the metadata of the data structures to access the copy of the target data block in the main memory without having to traverse the previous lookup path comprises utilizing the metadata of the data structures to directly access the copy of the target data block in the main memory without having to traverse any of the image layers of the image.

20. The system of claim 15, wherein utilizing the metadata of the data structures to access the copy of the target data block in the main memory without having to traverse the previous lookup path comprises:

traversing at least one image layer of the image along a current lookup path determined from a hierarchical data structure that represents the image to find the target data block, wherein the current lookup path comprises the previous lookup path; and utilizing the metadata of the data structures to access the copy of the target data block in the main memory without traversing the previous lookup path when the target data block is not found by traversing the at least one image layer of the image along the current lookup path.

* * * * *